July 28, 1964          O. SCHÄGG          3,142,440

MULTI-PART APEX SEAL

Filed May 9, 1962          2 Sheets-Sheet 1

INVENTOR.
OTTO SCHÄGG
BY
Thomas W. Kennedy
ATTORNEY

July 28, 1964   O. SCHÄGG   3,142,440
MULTI-PART APEX SEAL
Filed May 9, 1962   2 Sheets-Sheet 2

INVENTOR.
OTTO SCHÄGG
BY
Thomas W. Kennedy
ATTORNEY

United States Patent Office 3,142,440
Patented July 28, 1964

3,142,440
MULTI-PART APEX SEAL
Otto Schägg, Lindau-Enzisweiler (Bodensee), Germany, assignor to NSU Motorenwerke Aktiengesellschaft, Neckarsulm, Germany, and Wankel G.m.b.H., Lindau (Bodensee), Germany
Filed May 9, 1962, Ser. No. 193,476
Claims priority, application Germany June 9, 1961
5 Claims. (Cl. 230—145)

The present invention relates broadly to the art of rotary mechanisms and is particularly directed to sealing means for such rotary mechanisms.

The invention is particularly useful in connection with rotary mechanisms similar to that disclosed in U.S. Patent No. 2,988,065, although as will become apparent, this invention is not limited to this specific type of rotary mechanism. In the following description the invention is described in relation to an internal combustion engine but the invention is also suitable for fluid pumps and fluid motors.

A rotary mechanism as disclosed in said patent comprises an outer body having a cavity therein and an inner body or rotor disposed therein rotatable relative to the outer body, about an axis laterally spaced from but parallel to the axis of said cavity. The inner body is journaled on an eccentric portion of a shaft which is co-axial with the outer body and journaled in bearings carried by the outer body end walls. The outer body has axially-spaced end walls and a peripheral wall interconnecting the end walls to form said cavity; the inner surface of the cavity peripheral wall having a multi-lobe profile which preferably is basically an epitrochoid. The inner body has end faces disposed adjacent to said outer body end walls for sealing cooperation therewith and has a peripheral surface with a plurality of circumferentially-spaced apex portions, each carrying a radially-movable seal for sealing engagement with the multi-lobe inner surface of the outer body peripheral wall to form a plurality of working chambers between the two bodies which vary in volume upon relative rotation of the two bodies.

In prior rotary combustion engines of this type there is disposed in a groove at each apex portion of the inner body a single radially-movable seal strip whereby each adjacent pair of working chambers is separated by such an apex seal strip. During operation of the engine, under certain conditions, these apex seal strips may lift off and out of contact with the inner surface of the peripheral wall, and move radially inward. Any such apex seal movement results in a loss of sealing action, and in the case of a rotary combustion engine causes leakage of gases, particularly due to a communication between a working chamber in its compression cycle and the adjacent working chamber in its expansion cycle.

Lifting of the apex seal strip away from the inner surface of the outer body peripheral wall may take place when the pressure is temporarily the same on each side face of the seal strip and the seal strip has lost its stabilizing bearing contact with a side wall of the groove within which said seal strip is received.

Thus, as the engine operates, the changing pressures in the working chambers adjacent to an apex seal causes the seal to move first against one side wall of its groove and then against the other side wall. These fluctuating pressures may also cause radial inward movements of the apex seal off the peripheral wall inner surface. In addition, lifting of an apex seal from the peripheral wall inner surface may result from such other causes as vibrations of the inner body on its shaft, and irregularities of the peripheral wall inner surface whether caused by manufacturing errors, or thermal distortions, or elastic distortions.

An object of the present invention comprises the provision of a rotary combustion engine in which a novel seal arrangement for the working chambers is provided to maintain continuous and improved sealing during the various cycles of combustion.

Specifically, instead of providing only a single seal element at each apex portion, acting as a partition between the two adjacent working chambers; this invention provides two slightly spaced seal elements at each apex portion so that each working chamber is individually sealed by its own elements. In addition, since the pair of seal elements at each apex portion are spaced apart, an enclosure is formed therebetween. As far as the pressures in the working chambers are concerned, each apex seal element is affected only by the variable pressure in its working chamber. The gas pressure in the enclosure between each pair of apex seals can also be kept at atmospheric pressure by communicating the enclosures to the annular space formed between each inner-body end face and the adjacent outer-body end wall and by providing a vent connection to said annular space. Each such annular space is disposed between the end face seals carried by the inner body adjacent to its outer periphery and by its oil-seal adjacent to its inner diameter. Thus, the seal elements of each working chamber are able to position themselves entirely in accordance with the pressure therein, and maintain good sealing.

This invention also provides a passage connection from the aforementioned annular space at each rotor end face, to the working chamber in the induction phase only. If gases escape from the working chamber in the compression phase into said annular space through an enclosure, then these gases, which would otherwise be wasted, are returned to a working chamber in the induction phase through the passage connection, thereby preventing a total loss of these gases.

The invention also provides a simple means for lubrication of the inner surface of the outer body peripheral wall, and of the seal elements.

Other objects of the invention will become apparent upon reading the annexed detail description in connection with the drawing in which:

FIG. 3 is an enlarged, partial, end view of a typical apex portion of the rotor of the engine shown in FIG. 1;

Figure 1:
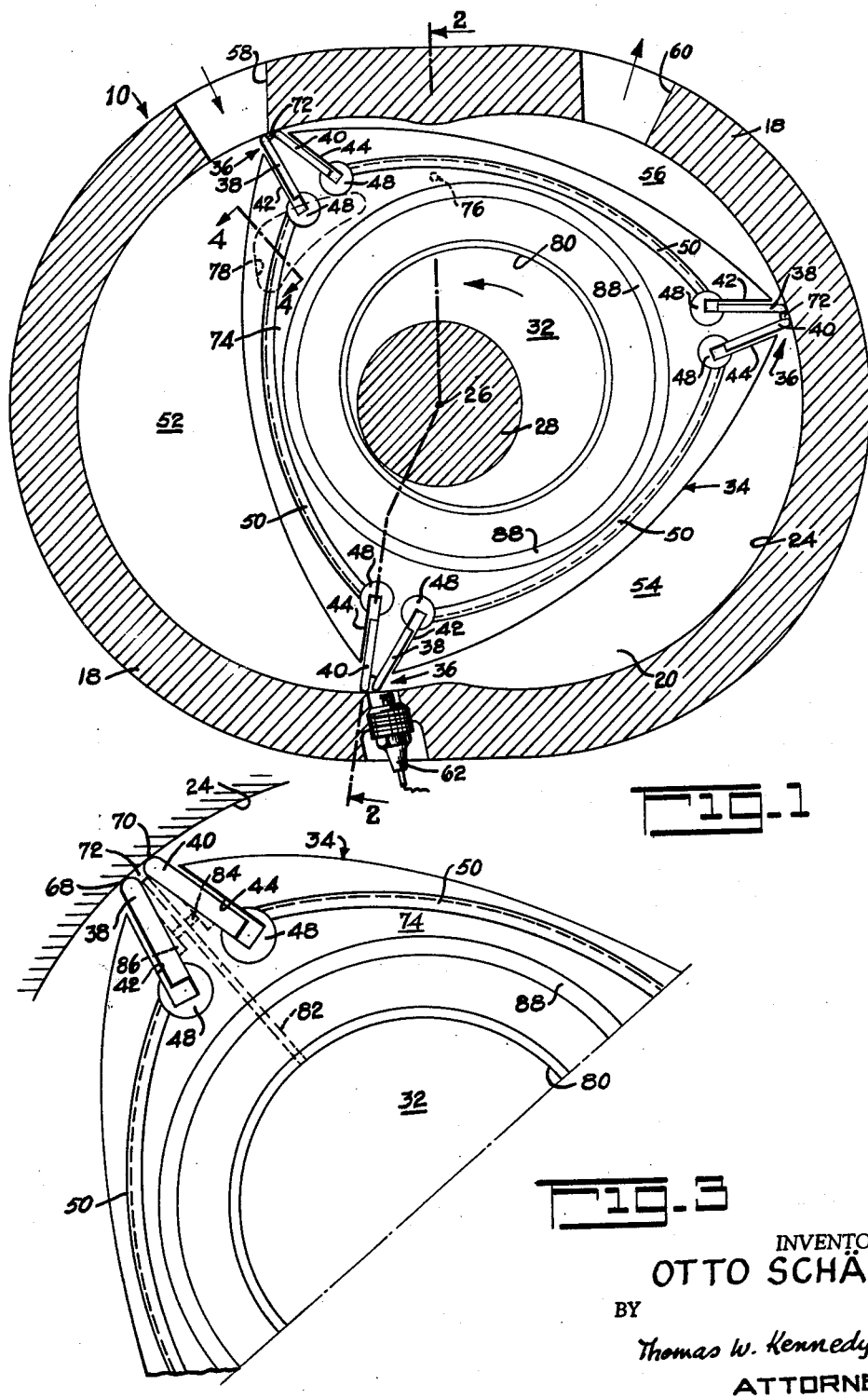
FIG. 1 is a schematic end elevation view of a rotary combustion engine embodying this invention taken along line 1—1 of FIG. 2.
Figure 2:
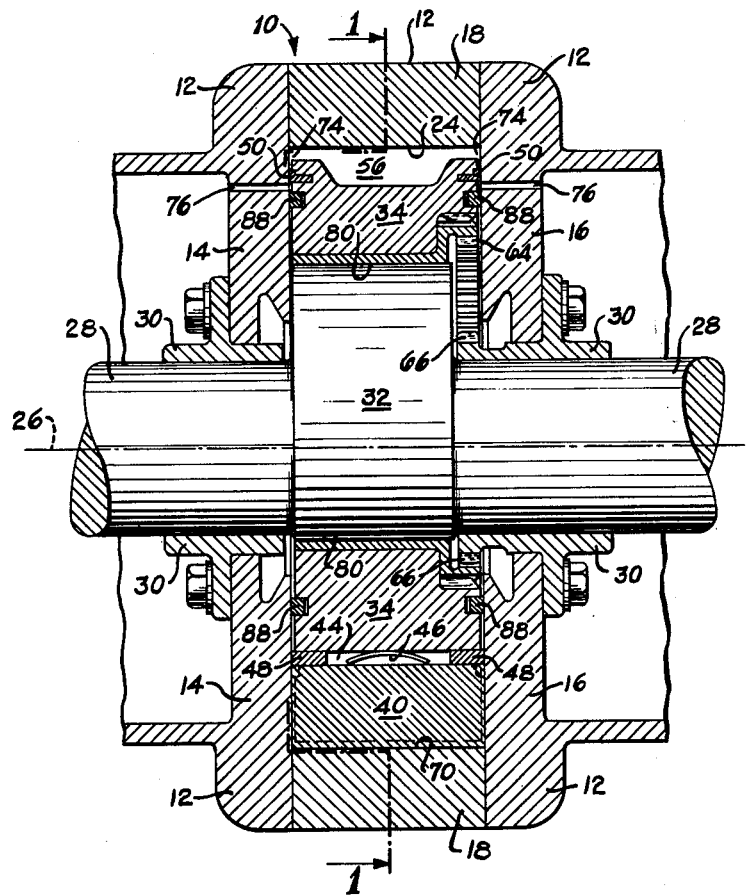
FIG. 2 is a longitudinal sectional view of a rotary combustion engine taken along line 2—2 of FIG. 1.
Figure 4:
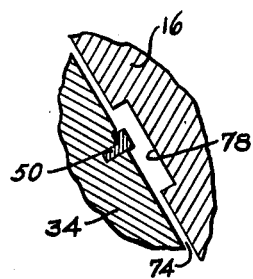
FIG. 4 is a partial sectional view of a passage connection in the outer body end wall, taken along line 4—4 in FIG. 1.

Referring to the drawings, a rotary combustion engine 10 is illustrated as comprising an outer body 12 having spaced end walls 14 and 16 and a peripheral wall 18 disposed between and interconnecting said end walls to form a cavity 20 therebetween. The inner surface 24 of the peripheral wall 18 has a multi-lobe profile which is basically an epitrochoid having an axis 26 along which the ends walls 14 and 16 are spaced.

A shaft 28, co-axial with the axis 26, extends through the outer body and is journaled in bearings 30 carried by the end walls 14 and 16. The shaft 28 has an eccentric portion 32 on which an inner body or rotor 34 is journaled. The inner body 34 has suitable seals, hereafter described, at its apex portions 36 and at each of its end faces for sealing cooperation with the outer body 12 to form a plurality of working chambers 52, 54 and 56, which vary in volume upon relative rotation of the inner and outer bodies.

The outer body has intake port means 58 for supply of an intake charge to the working chambers 52, 54 and 56 and has exhaust port means 60 for discharge of exhaust gases from the engine. If needed, a suitable spark plug 62 may be provided to ignite the intake charge.

In order to maintain the relative motion of the inner body 34 relative to the stationary outer body an internal gear 64 is, as illustrated, secured to the inner body co-axially with the inner body axis and is disposed in mesh with a fixed gear 66 secured to the outer body, said fixed gear being co-axial with the shaft 28. To prevent passage into the working chambers of the lubricating oil, serving the rotor eccentric bearing and the gears, and oil seal ring 88 is provided at each rotor end face which slides against the adjacent outer body end wall.

The engine so far described is substantially similar to the engine disclosed in the aforementioned patent and reference is made to said patent for a more detailed description of said engine.

According to the invention, each working chamber 52, 54 and 56, extending between adjacent apex portions 36, is individually sealed. For this purpose, there are provided, in each apex portion 36, a pair of spaced but adjacent grooves 42 and 44 each facing outwardly and running from one end face to the other of its inner body, and a pair of apex seal means, comprising two radially-movable seal strips 38 and 40 each of which is received within one of the two grooves 42 and 44. Each apex seal strip 38 and 40 is urged radially outward by spring means 46 into sealing engagement with the inner surface 24 of the peripheral wall 18. Each end of each apex seal strip 38 and 40 is in sealing cooperation with an intermediate sealing element 48. Each intermediate sealing element 48 is received within its associated groove 42 or 44, is axially-movable, and slides over the adjacent surface of the outer body end wall 14 or 16. Between the intermediate sealing elements 48 disposed at a pair of adjacent apex portions 36 and associated with a working chamber, the extends end-face-sealing and end-wall-engaging seal elements or end seal strips 50, such that each end face seal element 50 terminates at its own two intermediate seal elements 48. Each chamber 52, 54 and 56 has on two of its sides, end seal strips 50, disposed on each inner-body end face which are also axially movable to engage said adjacent end wall. Each chamber 52, 54 and 56 is thus independently and individually sealed by its own elements, which are separated and displaced from those of the adjacent working chambers. Each chamber is sealed by the sealing engagement of its apex seal strips 38 and 40 against the peripheral wall inner surface 24, and by the sealing engagement against the end walls 14 and 16 of the end faces of said apex strips 38 and 40, the associated intermediate seal elements 48 and the associated end seal strips 50. This arrangement has the advantage that the sealing of one working chamber is not influenced by the pressure conditions of the adjacent working chambers. Another advantage is that there are two apex seals 38 and 40, acting independently of each other, between each two adjacent working chambers 52, and 54 and 56.

As shown in particular in FIG. 3, the two apex seal strips 38 and 40 disposed at each apex portion 36, form an acute angle with one another with said seal strips converging toward each other in a radially outward direction. Because of this arrangement of the apex seal strips, the contact lines 68 and 70, or contact points in cross-sectional view, of the apex seal strips 38 and 40 against the inner surface 24 of the peripheral wall 18 are disposed very close together and as close to the line at which a single apex seal strip, centered on its apex portion, would contact the inner surface 24.

Also, an enclosure 72 is formed in the space between each pair of apex seal strips 38 and 40; this enclosure also being bounded by the portion of the inner surface 24 and the portion of the surface of the rotor apex portion 36 between said seal strips. It is desirable to assure that a pressure does not build up within the enclosures 72, due to leakage from the adjacent working chambers 52, 54 or 56, in order that each apex seal strip 38 and 40 is unaffected by the pressure in the working chamber on the remote side of its apex portion. To prevent this pressure increase, the enclosure 72 is disposed in communication with anular spaces 74, which are formed on each end of the inner body 34, one adjacent to each end wall 14, 16. The annular spaces 74 are each enclosed axially by an end wall 14, 16, by an end face of the inner body 34, and radially by the end seal strips 50 and the oil seal ring 88. There is always communication between the enclosure 72 and the annular spaces 74 because the inner-body end faces do not bear against the outer-body end walls 14 and 16 at the location between the ends of the apex seal strips 38, 40.

However, because these gaps or passages from the enclosures to the annular spaces are relatively narrow, it is advantageous if recesses or suitable channels are provided in the inner-body end faces.

Each annular space 74 may be vented to the atmosphere by providing passage means or a vent hole 76 in the adjacent outer body end walls 14 or 16. The vent hole 76 has its inner end in the inner face of the end wall 14 or 16 and is located at a point thereon which is always radially inside of the end seal strip 50 and radially outside of the oil seal ring 88, in all positions of the inner body 34.

Instead of or in addition to the vent holes 76 it is preferable to connect each annular chamber 74 with each working chamber periodically during its induction phase only. This is done by providing a passage connection or means 78 in the inner face of the adjacent end wall 14 or 16. As illustrated in FIG. 1, the passage connection 78 connects an annular chamber 74 with the working chamber 52, which is then in the induction phase and receiving an intake charge from the intake port 58. The purpose of this passage connection 78 is to carry back into the working chamber 52, which is in its induction phase, any gases that may previously have leaked across the apex and/or end face seals into an annular space 74. Any unburnt gases therein are thereby returned back to the working chambers.

For the purpose of lubricating the inner surface 24 of the peripheral wall 18, there may be provided lubricating oil passages 82, which, for example, pass from the inner body bearing surface 80 where the inner body 34 is mounted on the eccentric portion of the shaft 32, to their outlet into the enclosure 72. Branching off these passages 82, there are lubricating oil passages or conduits 84 that have their outlets in the grooves 42, 44, whereby the apex seal strips 38, 40 are lubricated. Distribution of the lubricating medium passing through the lubricating oil conduits 84 into the grooves 42 and 44 is accomplished by means of recesses 86, parallel to the axis 26.

While I have described by invention in detail in its present preferred embodiment it will be obvious to those skilled in the art after understanding my invention that various changes and modifications may be made therein without departing from the spirit or scope thereof.

What is claimed is:

1. A rotary mechanism comprising an outer body having axially-spaced end walls and an interposed peripheral wall forming a cavity therebetween, the inner surface of said peripheral wall having a multi-lobed profile which is basically epitrochoidal and having an axis along which said end walls are spaced; an inner body disposed within said outer body and rotatable relatively thereto about an axis displaced from but parallel to said outer body axis, said inner body having a plurality of circumferentially-spaced apex portions for sealing cooperation with said peripheral wall inner surface to form a plurality of working chambers therebetween which vary in volume upon relative rotation of said bodies; each said apex portion having a pair of spaced but closely adjacent outwardly-facing grooves disposed one on each side of said apex and running from one rotor end face to the other; a cooperating pair of seal strip members for each of said groove pairs, there being one member of each of said seal strip pairs disposed in each groove of said groove pairs, each of said seal strip pairs forming an acute angle therebetween with the radially outermost edges of said strip members of each pair converging and in close juxtaposition, said edges being in sealing engagement with said peripheral wall inner surface; a plurality of end face seal strip members carried by each end face of said inner body and projecting axially therefrom into sealing engagement with the adjacent end walls of said outer body, there being one end face seal strip member extending between each pair of adjacent apex portions of said inner body and generally parallel to the outer periphery of said inner body; and a plurality of axially movable intermediate seal elements positioned one at each end of each apex groove in sealing cooperation with the associated apex seal strip and the adjacent end of an end face seal; each of said pairs of outwardly converging apex seal strips defining an enclosure therebetween having passage means for venting said enclosure.

2. A rotary mechanism as claimed in claim 1 and in which said inner body has passages for supply of lubricating medium to said enclosures.

3. A rotary mechanism as claimed in claim 1 and in which said inner body end face has an oil seal ring disposed radially inwardly of said end face seal elements to form an annular space therebetween communicating with each said enclosure.

4. A rotary mechanism as claimed in claim 3 and in which said outer body has passage means venting said annular space in all positions of the inner body.

5. A rotary mechanism as claimed in claim 3 and in which said outer body has passage means connecting said annular space with each said working chamber periodically during its induction phase only.

References Cited in the file of this patent

UNITED STATES PATENTS

| | | |
|---|---|---|
| 1,617,863 | Planche | Feb. 15, 1927 |
| 2,801,791 | Walter | Aug. 6, 1957 |
| 2,831,631 | Petersen | Apr. 22, 1958 |
| 2,928,350 | Prendergast | Mar. 15, 1960 |
| 3,016,017 | Prendergast | Jan. 9, 1962 |
| 3,033,180 | Bentele | May 8, 1962 |

FOREIGN PATENTS

| | | |
|---|---|---|
| 818,025 | Great Britain | Aug. 12, 1959 |